United States Patent
Westerman et al.

(10) Patent No.: US 9,135,496 B2
(45) Date of Patent: Sep. 15, 2015

(54) EFFICIENT TEXTURE COMPARISON

(71) Applicant: Apple Inc., Cupertino, CA (US)

(72) Inventors: Wayne C. Westerman, Burlingame, CA (US); Byron B. Han, Cupertino, CA (US); Craig A. Marciniak, San Jose, CA (US)

(73) Assignee: Apple Inc., Cupertino, CA (US)

( * ) Notice: Subject to any disclaimer, the term of this patent is extended or adjusted under 35 U.S.C. 154(b) by 73 days.

(21) Appl. No.: 13/797,970

(22) Filed: Mar. 12, 2013

(65) Prior Publication Data

US 2013/0308838 A1 Nov. 21, 2013

Related U.S. Application Data

(60) Provisional application No. 61/649,210, filed on May 18, 2012.

(51) Int. Cl.
*G06K 9/62* (2006.01)
*G06K 9/00* (2006.01)
*G06F 21/32* (2013.01)
*G06F 21/60* (2013.01)

(52) U.S. Cl.
CPC .............. *G06K 9/0008* (2013.01); *G06F 21/32* (2013.01); *G06F 21/602* (2013.01); *G06K 9/00006* (2013.01)

(58) Field of Classification Search
None
See application file for complete search history.

(56) References Cited

U.S. PATENT DOCUMENTS

| | | | |
|---|---|---|---|
| 3,863,219 A | 1/1975 | Rohrer | |
| 5,828,773 A | 10/1998 | Setlak et al. | |
| 6,323,846 B1 | 11/2001 | Westerman et al. | |
| 6,546,152 B1 | 4/2003 | Hou | |
| 6,570,557 B1 | 5/2003 | Westerman et al. | |
| 6,677,932 B1 | 1/2004 | Westerman | |
| 6,788,340 B1 | 9/2004 | Chen et al. | |
| 6,795,569 B1 | 9/2004 | Setlak et al. | |

(Continued)

FOREIGN PATENT DOCUMENTS

| | | | | |
|---|---|---|---|---|
| WO | WO/2011/065130 | * | 6/2011 | ................ G06T 7/00 |
| WO | WO 2012/008168 | | 1/2012 | |
| WO | WO 2012/009791 | | 1/2012 | |

OTHER PUBLICATIONS

Rajanna et al., "A comparative study on feature extraction for fingerprint classification and performance improvements using rank-level fusion," *Pattern Anal. Applic.*, published online Apr. 28, 2009, DOI 10.1007/s10044-009-0160-3, 10 pages.

(Continued)

*Primary Examiner* — Sumati Lefkowitz
*Assistant Examiner* — David Perlman
(74) *Attorney, Agent, or Firm* — Brownstein Hyatt Farber Schreck, LLP

(57) ABSTRACT

A scannable object is sensed and scanned. A map is constructed based on the scan results. The map is compared to one or more stored templates. Results of the comparison are provided. In some implementations, a secured processor may construct the map and may provide reduced resolution (and/or other versions that contain less information) versions of the map and/or the stored templates to one or more other processors. The one or more other processors may determine a match-set based on matching between the reduced resolution map and stored templates. The secured processor may then identify whether or not a match exists between the map and any stored template based on the match-set.

19 Claims, 6 Drawing Sheets

(56) References Cited

U.S. PATENT DOCUMENTS

| | | | |
|---|---|---|---|
| 6,888,536 B2 | 5/2005 | Westerman et al. |
| 7,110,581 B2 | 9/2006 | Xia et al. |
| 7,194,115 B2 | 3/2007 | Uchida |
| 7,401,056 B2 | 7/2008 | Kam |
| 7,574,022 B2 | 8/2009 | Russo |
| 7,616,787 B2 | 11/2009 | Boshra |
| 7,634,117 B2 | 12/2009 | Cho |
| 7,692,693 B2 | 4/2010 | Misawa |
| 7,746,375 B2 | 6/2010 | Ketelaars et al. |
| 7,804,984 B2 | 9/2010 | Sidlauskas et al. |
| 7,853,053 B2 | 12/2010 | Liu et al. |
| 7,874,485 B2 | 1/2011 | Meier et al. |
| 7,876,310 B2 | 1/2011 | Westerman et al. |
| 7,903,847 B2 | 3/2011 | Higuchi |
| 8,032,758 B2 | 10/2011 | Tian |
| 8,077,935 B2 | 12/2011 | Geoffroy et al. |
| 8,090,163 B2 | 1/2012 | Schuckers et al. |
| 8,125,543 B2 | 2/2012 | Cho |
| 8,131,026 B2 | 3/2012 | Benkley et al. |
| 8,154,628 B2 | 4/2012 | Ishida et al. |
| 8,170,346 B2 | 5/2012 | Ludwig |
| 8,180,118 B2 | 5/2012 | Neil et al. |
| 8,295,560 B2 | 10/2012 | Abiko |
| 8,358,815 B2 | 1/2013 | Benkley et al. |
| 8,408,456 B2 | 4/2013 | Weintraub et al. |
| 8,515,139 B1 | 8/2013 | Nechyba et al. |
| 8,605,960 B2 | 12/2013 | Orsley |
| 8,631,243 B2 * | 1/2014 | Baldan et al. | 713/186 |
| 8,705,813 B2 | 4/2014 | Matsuyama et al. |
| 8,837,786 B2 | 9/2014 | Hwang et al. |
| 2002/0012455 A1 | 1/2002 | Benckert |
| 2009/0083228 A1 * | 3/2009 | Shatz et al. | 707/3 |
| 2010/0202671 A1 * | 8/2010 | Chen et al. | 382/125 |
| 2011/0274356 A1 | 11/2011 | Tasdizen et al. |
| 2011/0279664 A1 | 11/2011 | Schneider et al. |
| 2012/0045138 A1 | 2/2012 | Cote |
| 2012/0269440 A1 * | 10/2012 | Miyano | 382/190 |
| 2013/0004096 A1 | 1/2013 | Goh et al. |
| 2013/0053107 A1 | 2/2013 | Kang et al. |
| 2013/0083074 A1 | 4/2013 | Nurmi et al. |
| 2013/0272586 A1 | 10/2013 | Russo |
| 2013/0294660 A1 | 11/2013 | Heilpern et al. |
| 2013/0308838 A1 | 11/2013 | Westerman et al. |
| 2014/0003677 A1 | 1/2014 | Han et al. |
| 2014/0056493 A1 | 2/2014 | Gozzini |
| 2014/0212010 A1 | 7/2014 | Han et al. |
| 2014/0226879 A1 | 8/2014 | Westerman et al. |
| 2014/0241595 A1 | 8/2014 | Bernstein et al. |

OTHER PUBLICATIONS

Author Unknown, "Fingerprint Recognition," National Science and Technology Council (NSTC), Committee on Technology, Committee on Homeland and National Security, Subcommittee on Biometrics, Aug. 7, 2006, 13 pages.
U.S. Appl. No. 13/763,594, filed Feb. 8, 2013, Westerman et al.
U.S. Appl. No. 13/798,025, filed Mar. 12, 2013, Han et al.
U.S. Appl. No. 13/843,119, filed Mar. 15, 2013, Lyon et al.
U.S. Appl. No. 13/843,457, filed Mar. 15, 2013, Vieta et al.
U.S. Appl. No. 14/244,143, filed Apr. 3, 2014, Han et al.

* cited by examiner

EFFICIENT TEXTURE COMPARISON

CROSS-REFERENCE TO RELATED APPLICATIONS

The present application claims the benefit under 35 U.S.C. §119(e) to U.S. Provisional Patent Application No. 61/649,210, which was filed on May 18, 2012, and entitled "Efficient Texture Comparison," which is incorporated by reference as if fully disclosed herein.

TECHNICAL FIELD

Embodiments described herein relate generally to a device and process for efficient texture pattern comparison and matching, and more specifically to fingerprint matching on a portable device.

BACKGROUND DESCRIPTION

Fingerprint sensing technology has become widespread in use and is often used to provide secure access to sensitive electronic devices and/or data. Generally, capacitive fingerprint sensors may be used to determine an image of a fingerprint through measuring capacitance through each pixel of a capacitive sensor. The higher the capacitance, the nearer the surface of an adjacent or overlying finger to the pixel. Thus, fingerprint ridges provide a higher capacitance in an underlying pixel than do fingerprint valleys. There are other types of fingerprint sensors, such as optical sensors.

Typically, fingerprint sensors have been tied to relatively powerful computers, such as PCs or laptops, or incorporated in specialty devices specifically designed for fast processing and sufficient battery life of the scanner.

Portable user devices, such as smart phones and tablets, are more and more common, and include more and more features and functions. Such devices become more powerful and less battery intensive all the time, but still have relatively smaller computational resources and a constant concern over battery consumption rates.

Accordingly, there is a need for an improved functionality in highly mobile devices, and a need for a computationally efficient implementation of the improved functionality.

SUMMARY

The present disclosure provides systems, methods, and apparatuses for efficient texture comparison. A scannable object may be sensed and scanned. A map may be constructed based on the scan results. The map may be compared to one or more stored templates. Results of the comparison may be provided.

In some implementations, a secured processor may construct the map and may provide reduced resolution (and/or other versions that contain less information) versions of the map and/or the stored templates to one or more other processors. The one or more other processors may determine a match-set based on matching between the reduced resolution map and stored templates. The secured processor may then identify whether or not a match exists between the map and any stored template based on the match-set.

DETAILED DESCRIPTION

Generally, embodiments discussed herein may provide efficient and secure texture sensing on a device, such as a smart phone. For example, a smart phone touch screen can be configured with a fingerprint sensor (e.g., a capacitive sensor) over part or all of the touch screen interface, the device housing, and/or other device inputs.

The present disclosure provides systems, methods, and apparatuses for efficient texture comparison. A scannable object may be sensed and scanned. A map may be constructed based on the scan results. The map may be compared to one or more stored templates. Results of the comparison may be provided. It should be appreciated that embodiments described herein may be used with any suitable fingerprint sensor, including swipe or strip sensors, two-dimensional array sensors, and the like.

In some implementations, a secured processor may construct the map and may provide reduced resolution (and/or other versions that contain less information) versions of the map and/or the stored templates to one or more other processors. The one or more other processors may determine a match-set based on matching between the reduced resolution map and stored templates. The secured processor may then identify whether or not a match exists between the map and any stored template based on the match-set.

Figure 2:
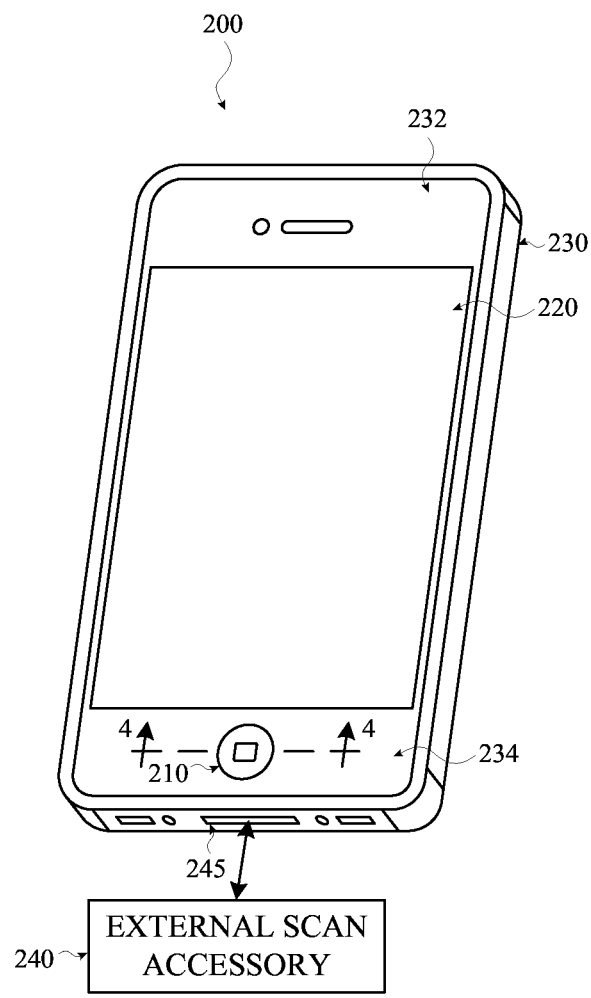
FIG. 2 depicts a sample electronic device incorporating the embodiment of a capacitive sensing array.

FIG. 2 depicts an electronic device 200 that may incorporate a fingerprint sensor, e.g., a capacitive sensor. The electronic device may be a mobile telephone, a tablet computing device, a notebook computer, a personal digital assistant, a desktop computer, a portable media player, and the like. The sensor pad may be placed anywhere on device 200, such as below an input mechanism, e.g., button 210, an input and/or output mechanism, e.g., screen 220, and/or a casing/housing, e.g., device housing 230 of the electronic device. The sensor may occupy part of an area (e.g., part of button 210), a whole area (e.g., all of screen 220), or an area that spans part/all of more than one of the areas. For example, a sensor may cover screen 220 and extend past the edge, covering all or part of forehead area 232 and/or chin area 234. Essentially, any portion of the electronic device's enclosure may house the fingerprint sensor.

In certain exemplary embodiments, the device can include a separate attachment, such as external scan accessory 240. Accessory 240 is shown connected to device I/O port 245, which could be via a flexible wire connection, a ridged connection (e.g., simulating an extension of the device housing via a fastening mechanism (e.g., a snap together interface)). In other exemplary embodiments, this connection can be wireless via a proprietary protocol or a common protocol (e.g., Bluetooth, WiFi, GSM/CDMA/4G, etc.).

Figure 3:
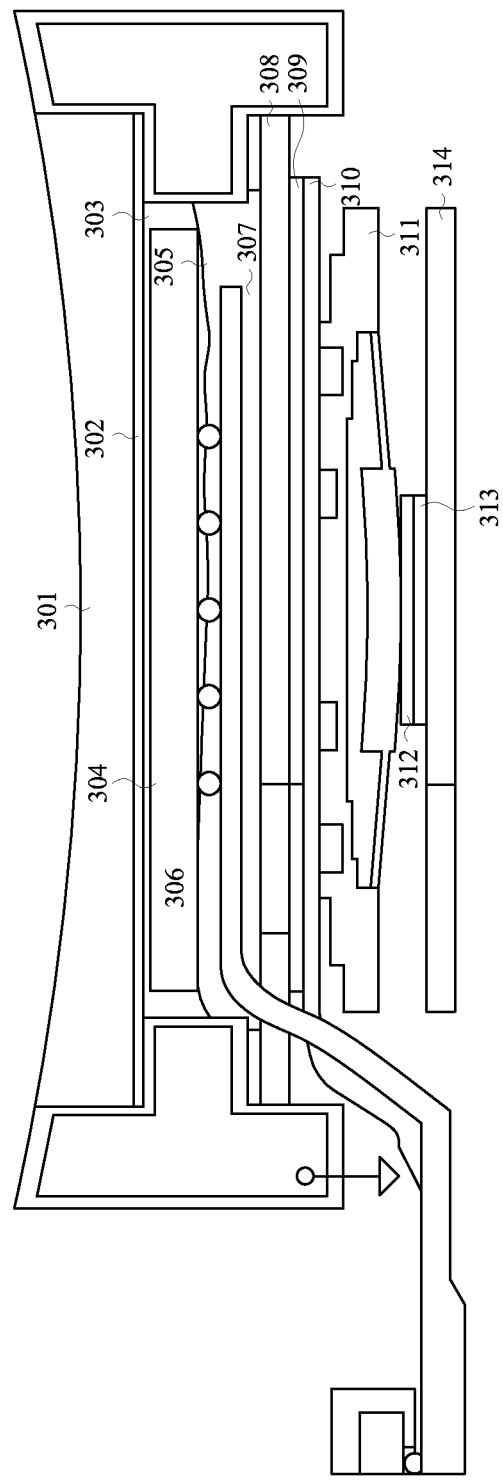
FIG. 3 is a cross-sectional view taken along line 4-4 of FIG. 2, showing the embodiment of a capacitive sensing array incorporated into a stack-up with an input device.

In certain exemplary embodiments, as mentioned above, the sensor may be included within the device housing, display, or other area, such as input button 210. FIG. 3 illustrates one exemplary embodiment of a fingerprint scanner/sensor disposed beneath button 210. FIG. 3 is a cross-sectional view of the electronic device of FIG. 2, taken along line 4-4 of FIG. 2, which may include the layers: cover dielectric 301, ink 302, liquid adhesive 303, silicon TSV (3 um pass) 304, solder 305, flex 306, air gap 307, stiffener 308, adhesive 309, flex 310, tact 311, shim 312, adhesive 313, and bracket 314. As shown in FIG. 3, the fingerprint sensor chip (including both sensor pad and drive ring) may be positioned beneath the button (e.g., 210), which may be the cover dielectric 301. As illustrated, the top layer cover dielectric 301 is concave, as exemplary button 210 may be concave. A similar illustration, with differing dimensions and features, could show a flat screen in this layer extending to a housing, etc. In the exemplary embodiments of a button sensor, an ink layer and/or adhesive may be placed between the button's bottom surface and the sensor chip's top surface. The adhesive may bond the chip to the button, for example. One or more solder balls may affix the fingerprint sensor chip to a flex conductor. The solder balls may generally be placed near the center of the fingerprint sensor chip to reduce the likelihood of cracking due to stress.

Figure 1:
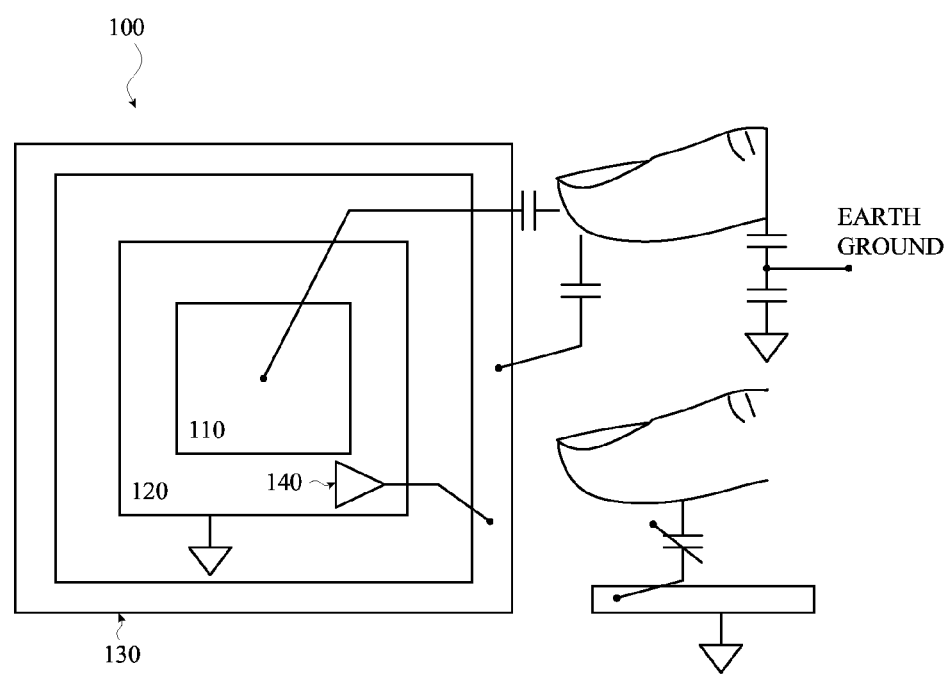
FIG. 1 depicts a block diagram of a sample capacitive sensing array.

The exemplary scanner shown in FIG. 3, accessory 240, and/or any other configuration incorporating a texture sensor/scanner with a user device may include a capacitive sensor (e.g., the same, similar, or different than the capacitive sensor shown in FIG. 1), or any number of other types of sensors capable of sensing a texture/pattern of an adjacent or proximate object (e.g., an optical sensor) can be used in one or more exemplary embodiments.

Figure 4:
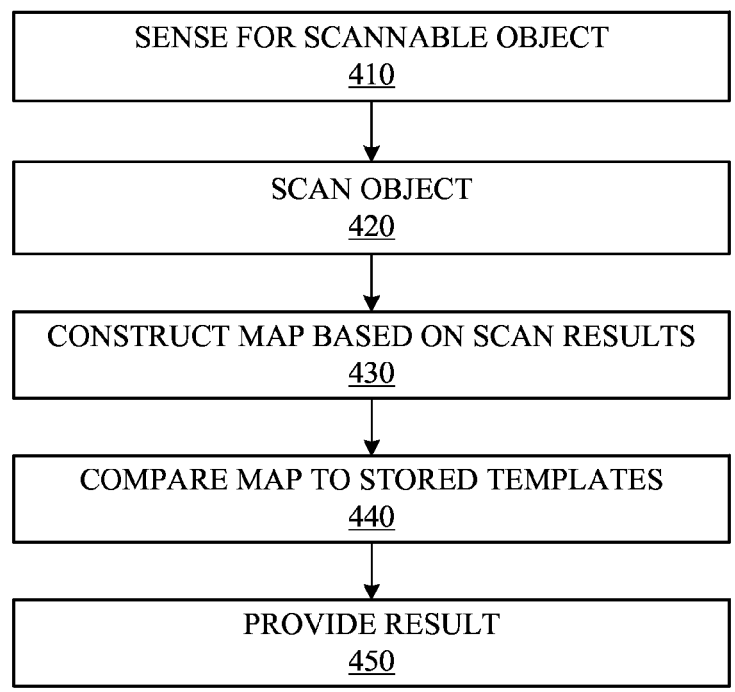
FIG. 4 is an exemplary process for efficiently matching a scanned pattern according to one exemplary embodiment.

Regardless of the location or configuration of the sensor, the exemplary device, including the exemplary sensor, can execute an exemplary process for matching a scanned texture with stored templates. FIG. 4 illustrates one such exemplary process. The exemplary process may start at 410 by sensing or detecting a scannable object. This may be a low power state, where power consumption is reduced while waiting for a sensed object. A scannable object can be one close to the device scanner or in contact with the device scanner. In other exemplary embodiments, the object may be "scannable" if it has a texture that can be detected, and in other exemplary embodiments an object may be scannable based on proximity, while the texture (or lack thereof) can be detected later in the exemplary process.

Once a scannable and/or proximate object has been detected, the exemplary process (e.g., using the exemplary device and sensor) can scan the object at 420. The sensor results, which may vary depending on the type of sensor used (e.g., capacitive, optical, etc.), can then be used to construct a map associated with (e.g., descriptive of) the scanned features of the objects texture at 430.

One such exemplary map can include a ridge flow map or direction map, which represents the direction of ridge flow within the scanned fingerprint image. As just one example of how a ridge flow map can be computed and stored: the exemplary map may contain a grid of integer directions, where each cell in the grid represents, e.g., an 8×8 pixel neighborhood in the image. Ridge flow angles can be quantized into, e.g., 16 integer bi-directional units equally spaced on a semi-circle. In this example, starting with vertical direction 0, direction units can increase clockwise and represent incremental jumps of 11.25 degrees, stopping at direction 15 which is 11.25 degrees shy of vertical. Using this scheme, direction 8 is horizontal. A value of −1 in this map represents a neighborhood where no valid ridge flow was determined. Other exemplary methods of producing a ridge flow map are also possible, including different sizes, value ranges, matrix configurations, etc. Further, other map types are also possible, such as a quality map, contrast map, etc.

Figure 5:
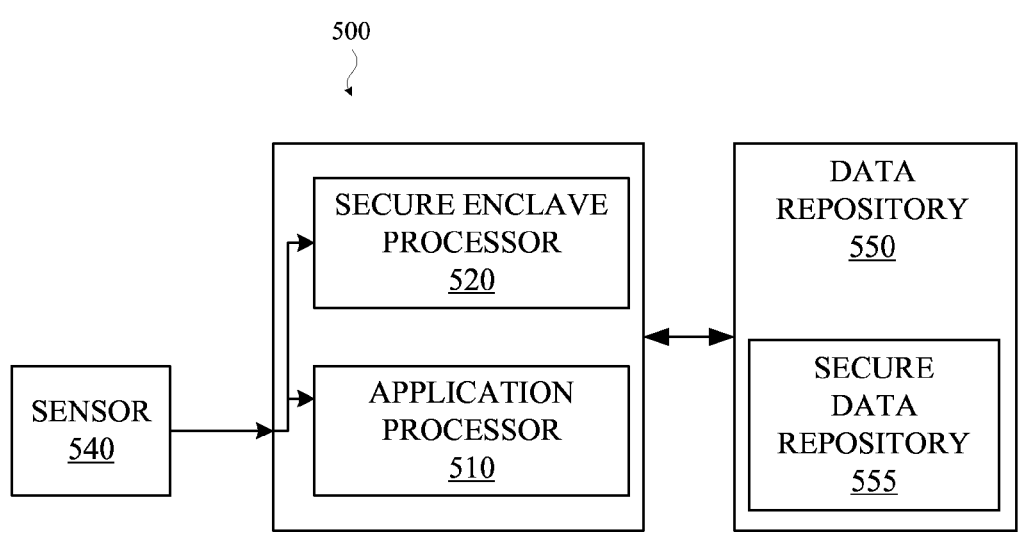
FIG. 5 is an exemplary system for efficiently matching a scanned pattern according to one exemplary embodiment.

FIG. 5 shows an exemplary system that can be used to execute one or more exemplary processes. The exemplary system can include a sensor 540, which can be sensor 100, sensor 240, the sensor of FIG. 3, or any number of other exemplary sensors. This sensor can include a separate encryption/security feature/module (not shown) or send data to processor block 500 without a separate security module. The processor 500 can include an application processor (AP) 510 and a secure enclave processor (SEP) 520. Each of these processors can include multiple processors, multiple cores, or reside on the same processor. The application processor 510 can be a general processor, responsible for several processing tasks of the device it resides within. The secure enclave processor 520 can be specially and/or specifically designed/configured to perform encrypted tasks, such as encrypting data associated with an authorized user's fingerprint/ID-pattern.

Processor block 500 can be connected to sensor 540 by any number or wired or wireless connections, using any number of transmission protocols, such as a serial peripheral interface (SPI). Processor block 500 can also be connected to a data storage repository 550, which can include any number of mediums (e.g., magnetic material, solid state memory, etc.) Data repository 550 can include a secure data repository 555, which can include encrypted data, e.g., data associated with an authorized user's fingerprint/ID-pattern. Secure repository 555 can be separate from the main repository 550 or a part of the main repository 550. In the example of fingerprint patterns (e.g., maps based on a scanned fingerprint pattern), the repository can store files for multiple authorized users, files for multiple fingers (e.g., 10) of each user, multiple files for each finger, etc.

In a first exemplary operation, sensor 540 can scan a texture of an object. This texture can be translated into an associated map by sensor 540, AP 510, or SEP 520. The SEP 520 can then retrieve encrypted templates (e.g., based on patterns associated with authorized users), and match the translated map with the encrypted templates. The SEP (e.g., via the AP, operating system (OS), and input/output devices (I/O)) can then provide a result, such as maintaining the screen lock (no match), or unlocking the device. Personal settings associated with the particular authorized user can also be pre-loaded at unlock.

The SEP 520 may have less computational resources than the more general processor AP 510, and thus be some degree slower. In order to provide efficient and faster matching, certain exemplary embodiments may push some or all of the matching operations to the AP 510. The AP 510 can identify a match and provide a result or identify the match so that a result can be provided. In one exemplary embodiments, the SEP 520 may decrypt the match templates and pass them to the AP 510 for match processing. While the SEP 520 may be needed for encryption/decryption (as AP 510 may be unsecured), the process can be greatly sped up, as the SEP 520 only has to perform tasks it was designed for (encryption/decryption), while the more powerful AP 510 can perform the more computationally intensive matching procedures.

A potential drawback of the above described exemplary embodiment can be that the AP 510 is unsecured or partially unsecured, and certain exemplary template maps may contain sufficient information that a malicious unauthorized user (e.g., someone who steals the device) could reverse engineer the exemplary template to construct a pattern that could unlock the device (e.g., sufficiently mimic an authorized user's fingerprint pattern). For example, an unauthorized user could intercept a decrypted template from the unsecured AP 510, and use the template data to construct an artificial object with associated properties (e.g. properties that when scanned would produce data that matched the intercepted template).

To overcome this potential security drawback, another exemplary embodiment of the present disclosure can include a process of collapsing the full maps into a sort of checksum, hash function, or histogram. For example, each encrypted ridge map template can have some lower resolution pattern computed and associated with the ridge map. One exemplary pattern could be a histogram of, e.g., the most common angles (e.g., a 2 dimensional (2D) array of common angles). The exemplary pattern could include in each slot an average value over a respective vector of the map. The exemplary pattern could include in each slot a sum of the values over a respective vector of the map. The exemplary pattern could include the smallest or largest value within a respective vector of the map, or could be a difference between a largest and a smallest value within the respective vector of the map. The exemplary pattern could simply be a particular vector, e.g., the pattern is merely the Nth vector of the map. Exemplary patterns can include more than one vector. For example, for an N by N map, the exemplary pattern could be the four edge vectors (e.g., the $1^{st}$ and Nth column, and the $1^{st}$ and Nth row), or any other sampling, positions, or calculated reduction. Numerous other exemplary embodiments are also possible, and any other exemplary pattern calculation can be used, where the exemplary pattern includes enough associated information to narrow the candidate list, while omitting enough associated information that the unsecured pattern cannot or cannot easily be reverse engineered into a matching texture.

In an exemplary process for this exemplary embodiment, a scanned object can have a ridge map calculated from the scanner input, e.g., in the SEP 520. This encrypted ridge map can then have an unencrypted pattern calculated (according to the implemented protocol) and sent to the AP 510. This pattern can be compared to patterns associated with the stored encrypted templates, which can be calculated in real-time or preferably be stored to reduce computation. Several of the templates may be different, but have the same or similar associated patterns, since two different templates may have values the same or similar in the areas used to determine the lower resolution patterns. Thus, the AP 510 may return multiple positive results (and might also return a single match or no matches as determined with the scanned pattern to be compared). The SEP 520 can then access the encrypted ridge maps associated with any patterns identified by the AP 510 as matching. The SEP 520 can then compare the ridge map of the scanned pattern with the small subset of possible matches, instead of the entire library of possible matches. This exemplary embodiment can therefore greatly speed up the computation of map matching by leveraging the powerful AP, while maintaining encrypted security of the stored ridge maps.

As mentioned earlier, any number of other exemplary embodiments are also possible, and the above example is presented with certain specific implementations (e.g., using ridge maps for patterns) for illustration purposes, but could be applied to any number of other exemplary embodiments having other exemplary implementations.

Figure 6:
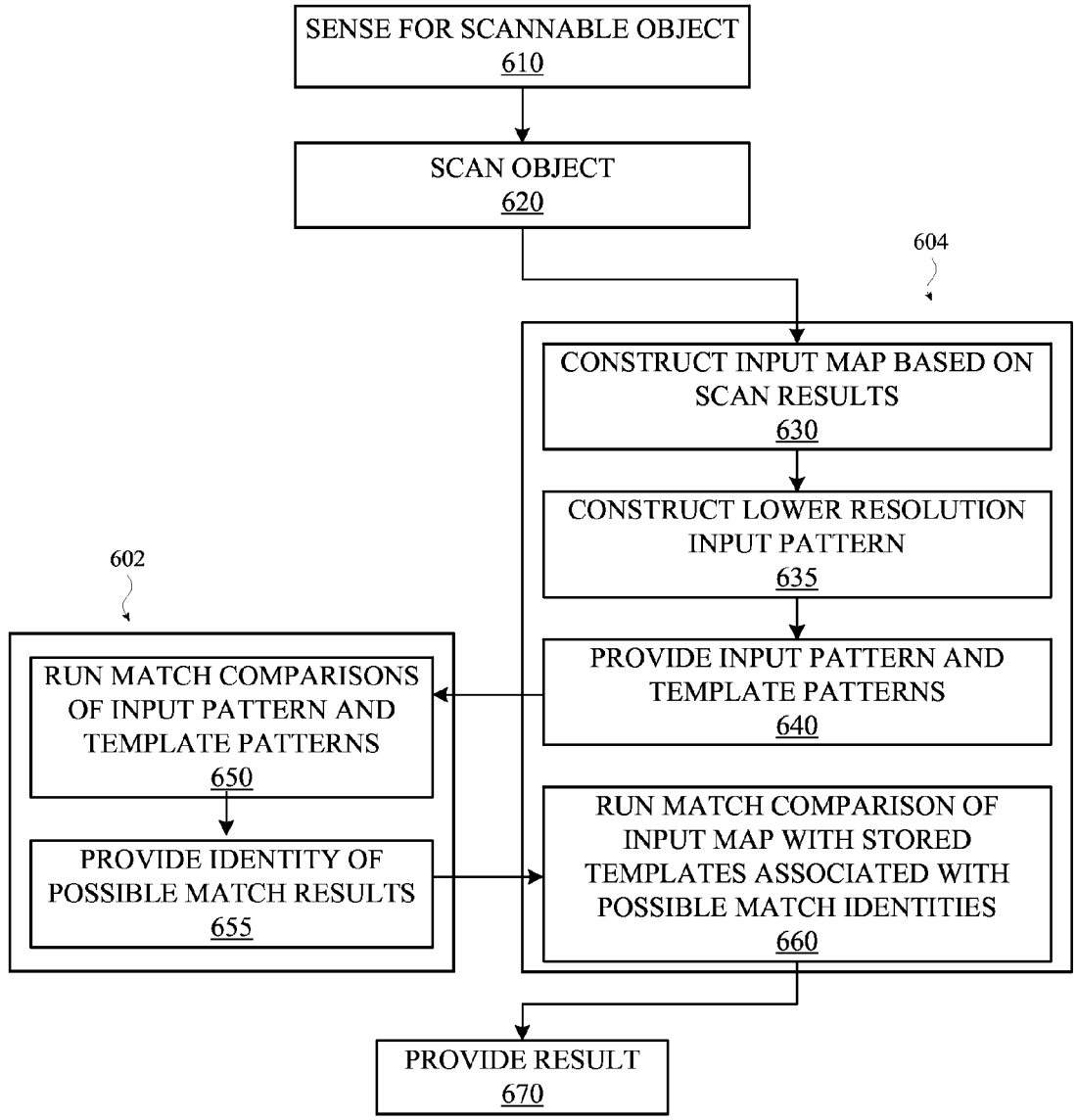
FIG. 6 is an exemplary process for efficiently and securely matching a scanned pattern according to one exemplary embodiment.

FIG. 6 illustrates an exemplary embodiment of this exemplary process. At 610, the exemplary process can sense or detect an object to scan. At 620 the exemplary process scans the object. Secure process 604 then constructs an input map based on the scan results at 630. The secure process 604 can then construct a lower resolution pattern 635. Secure process 604 can then load, determine, or otherwise provide stored template patterns (associated with stored template maps) and the input pattern to a process 602, which can be unsecured, partially secured, secured with a different protocol, or secured in the same manner as process 604. Process 602 can then run a match comparison of the input pattern and the received template patterns at 650. At 655, process 602 can provide the identity of possible match results to secured process 604. This can be a pointer, an identification, or the actual matching pattern. The secure process 604 can then run (e.g., at 660) a full match comparison of the input map and the stored templates associated with those possible matches identified at 655. Finally, the exemplary process can provide the results at 670.

Although embodiments have been described herein with respect to particular configurations and sequences of operations, it should be understood that alternative embodiments may add, omit, or change elements, operations and the like. Accordingly, the embodiments disclosed herein are meant to be examples and not limitations.

I claim:

1. A device, comprising:
at least one encrypted processor that is configured to determine an input map associated with a texture pattern and calculate a reduced resolution pattern based on the input map, and calculate one or more reduced resolution template patterns, each reduced resolution template pattern based on a respective stored encrypted template map; and
at least one unsecured processor, communicably connected to the at least one encrypted processor, that is configured to:
receive the reduced resolution pattern and the one or more reduced resolution template patterns and identify a match-set if a match exists between the reduced resolution pattern and at least one reduced resolution template pattern, wherein the at least one encrypted processor is further configured to receive the match-set and identify if a match exists between the input map and any stored encrypted template map that is associated with the match-set.

2. The device of claim 1, wherein the match-set includes an identity of each reduced resolution template pattern that matches the reduced resolution pattern or an identify of each stored encrypted template map associated with each reduced resolution template pattern that matches the reduced resolution pattern.

3. The device of claim 1, wherein the at least one second processor is configured to identify a plurality of possible matches.

4. The device of claim 1, wherein the at least one second processor is faster than the at least one encrypted processor.

5. The device of claim 1, wherein at least one of:
the reduced resolution pattern comprises at least one of a checksum generated from the texture pattern, a hash generated from the texture pattern, or a histogram generated from the texture pattern; or
each reduced resolution template pattern comprises at least one of a checksum generated from the respective associated stored encrypted template map, a hash generated from the respective associated stored encrypted template map, or a histogram generated from the respective associated stored encrypted template map.

6. The device of claim 1, wherein the reduced resolution pattern includes sufficient information to identify a match-set between the reduced resolution pattern and the one or more reduced resolution template pattern patterns but not sufficient information to determine the input map from the reduced resolution pattern.

7. The device of claim 1, wherein each reduced resolution template pattern includes sufficient information to identify a match-set based on comparison of the reduced resolution pattern and the reduced resolution template pattern but not sufficient information to determine the respective associated stored encrypted template map.

8. The device of claim 1, further comprising at least one device scanner, communicably connected to the at least one encrypted processor that obtains the texture pattern by scanning at least one scannable object.

9. The device of claim 8, wherein the at least one scannable object comprises at least one fingerprint.

10. A method, comprising:
    determining, utilizing at least one secure processor, an input map based on a scan input, wherein the scan input is associated with a texture pattern;
    calculating a reduced resolution pattern, utilizing the at least one secure processor, based on the input map;
    calculating one or more reduced resolution template patterns, utilizing the at least one secure processor, wherein each reduced resolution template pattern is based on a respective encrypted template map;
    providing the reduced resolution pattern and the one or more reduced resolution template patterns to at least one general processor utilizing the at least one secure processor;
    receiving, utilizing the at least one secure processor, a match-set identified by the at least one general processor if a match exists between the reduced resolution pattern and at least one reduced resolution template pattern; and
    identifying, utilizing the at least one secure processor, whether a match exists between the input map and any encrypted template map that is associated with the match-set.

11. The method of claim 10, further comprising determining, utilizing the at least one general processor, whether the reduced resolution pattern matches at least one of the one or more of reduced resolution template patterns.

12. The method of claim 10, further comprising receiving the scan input utilizing the at least one secure processor.

13. The method of claim 10, further comprising providing a result based on determining if the input map matches one or more of the template maps utilizing the at least one secure processor.

14. The method of claim 10, wherein at least one of:
    the reduced resolution pattern comprises at least one of a checksum generated from the texture pattern, a hash generated from the texture pattern, or a histogram generated from the texture pattern; or
    each reduced resolution template pattern comprises at least one of a checksum generated from the respective associated template map, a hash generated from the respective associated template map, or a histogram generated from the respective associated template map.

15. The method of claim 10, wherein the reduced resolution pattern includes sufficient information to identify a match-set between the reduced resolution pattern and the one or more reduced resolution template patterns but not sufficient information to determine the input map from the reduced resolution pattern.

16. The method of claim 10, wherein each reduced resolution template pattern includes sufficient information to identify a match-set based on comparison of the reduced resolution pattern and the reduced resolution template pattern but not sufficient information to determine the respective associated template map.

17. The method of claim 10, further comprising:
    sensing for at least one scannable object; and
    obtaining the scan input by scanning the at least one scannable object.

18. The method of claim 17, wherein the at least one scannable object comprises at least one fingerprint.

19. The method of claim 10, wherein the match-set includes an identity of each reduced resolution template pattern that matches the reduced resolution pattern or an identify of each template map that is associated with each reduced resolution template pattern that matches the reduced resolution pattern.

* * * * *